(12) United States Patent
Kumar et al.

(10) Patent No.: US 9,189,049 B2
(45) Date of Patent: Nov. 17, 2015

(54) POWER MANAGEMENT IN A DEVICE

(75) Inventors: Udit Kumar, Greater Noida (IN); Shiv Kumar Singh, Greater Noida (IN); Pooja Agarwal, Greater Noida (IN)

(73) Assignee: STMICROELECTRONICS INTERNATIONAL N.V., Amsterdam (NL)

( * ) Notice: Subject to any disclaimer, the term of this patent is extended or adjusted under 35 U.S.C. 154(b) by 1157 days.

(21) Appl. No.: 12/643,027

(22) Filed: Dec. 21, 2009

(65) Prior Publication Data

US 2010/0162019 A1 Jun. 24, 2010

(30) Foreign Application Priority Data

Dec. 24, 2008 (IN) .......................... 2937/DEL/2008

(51) Int. Cl.
*G06F 1/32* (2006.01)
*H04N 5/63* (2006.01)

(52) U.S. Cl.
CPC ................ *G06F 1/3203* (2013.01); *H04N 5/63* (2013.01); *G06F 1/3206* (2013.01); *G06F 1/3287* (2013.01)

(58) Field of Classification Search
CPC .............................. G06F 1/3203; G06F 1/3287
USPC .................................................. 713/300, 323
See application file for complete search history.

(56) References Cited

U.S. PATENT DOCUMENTS

| | | | |
|---|---|---|---|
| 2004/0268278 A1* | 12/2004 | Hoberman et al. ............... 716/5 |
| 2006/0123252 A1* | 6/2006 | Vaidya et al. ................. 713/300 |
| 2006/0156004 A1* | 7/2006 | Alba Pinto et al. ........... 713/176 |
| 2006/0259799 A1* | 11/2006 | Melpignano et al. ......... 713/300 |
| 2007/0124607 A1* | 5/2007 | Fuchs ........................... 713/300 |
| 2008/0201509 A1* | 8/2008 | Cheng ........................... 710/106 |
| 2008/0263324 A1* | 10/2008 | Sutardja et al. ................. 712/43 |
| 2008/0301474 A1* | 12/2008 | Bussa et al. ................... 713/300 |
| 2008/0301691 A1* | 12/2008 | Mamagkakis et al. ........ 718/104 |
| 2009/0049312 A1* | 2/2009 | Min ............................... 713/300 |
| 2009/0240959 A1* | 9/2009 | Conroy et al. ................ 713/300 |
| 2009/0292934 A1* | 11/2009 | Esliger ......................... 713/323 |
| 2010/0115314 A1* | 5/2010 | Sultenfuss .................... 713/323 |

* cited by examiner

*Primary Examiner* — Kim Huynh
*Assistant Examiner* — Brandon Kinsey
(74) *Attorney, Agent, or Firm* — Allen, Dyer, Doppelt, Milbrath & Gilchrist, P.A.

(57) ABSTRACT

Implementations of power management in a device are described. The device includes a power driver configured to manage power supply to one or more components in system-on-chip (SOC) hardware. The device further includes power subsystems configured as drivers for controlling the components of the SOC hardware and a user interface configured to receive a selected power mode as an input and identify profiles of one or more applications being executed in the device. Based on the selected power mode, the power driver directs the power subsystems to change a mode of operation of at least one component determined from the profiles of the one or more applications being executed.

8 Claims, 7 Drawing Sheets

POWER MANAGEMENT IN A DEVICE

RELATED APPLICATION

The present application claims priority of Indian Patent Application No. 2937/DEL/2008 filed Dec. 24, 2008, which is incorporated herein in its entirety by this reference.

FIELD OF THE INVENTION

The subject matter described herein, in general, relates to power management and in particular, relates to managing power consumption in a device.

RELEVANT BACKGROUND

Electronic devices, such as home entertainment devices and personal communication devices, are provided with multiple functionalities to enhance user experience. However, increase in functionalities has led to an increase in the complexity as well as power consumption of these devices. For example, in home entertainment devices, such as a set top box, adding the High Definition (HD) functionality would increase the overall power consumption by 5 to 10 Watts (W) as HD video content requires more picture information to be processed. The HD functionality would also require an increase in the hard disk recording capabilities or a digital video recorder (DVR) functionality, which would further contribute to about 10 W of power usage.

With growing awareness about the necessity for energy conservation, various regulatory authorities and standards committees across the globe are making it mandatory for manufacturers of electronic devices to reduce power consumption of devices, especially when the devices are operating in standby modes. Accordingly, European Union Code of Conduct has defined two types of standby modes: active and passive. In the active standby mode, some drivers of an electronic device keep receiving power while others are cut-off from the power supply, thus saving marginal power. On the other hand, in the passive standby mode, all the drivers are cut-off from the power supply, thus saving considerably more power than that in the active mode, however, causing high latency in resumption of the device. The high latency is faced because the time taken to initialize device clocks and processors, on re-starting from the passive standby mode, is high.

Apart from defining the modes, the standards committees have also specified power consumption norms for each of the standby modes. For example, the European Union Code of Conduct requires that the active standby power consumption for digital cable boxes, set top boxes, and multi function boxes, is limited to a value of between 9-12 W and passive standby power consumption is limited to a value less than 6 W.

SUMMARY

This summary is provided to introduce power management for devices, such as set top boxes, digital video disc (DVD) players, and digital television. These concepts are further described below in the detailed description. The summary is not intended to identify essential features of the claimed subject matter nor is it intended for use in determining the scope of the claimed subject matter.

In one embodiment, a device is provided with one or more power modes for managing the power consumed by the device. The device includes power subsystems configured as drivers for controlling the components of a system-on-chip (SOC) hardware present in the device. A user interface provided in the device receives an input of the selected power mode and identifies profiles of one or more applications being executed in the device. Based on the selected power mode, a power driver directs the power subsystems to change a mode of operation of at least one component of the SOC hardware determined from the profiles of the one or more applications being executed.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION OF PREFERRED EMBODIMENTS

Figure 1:
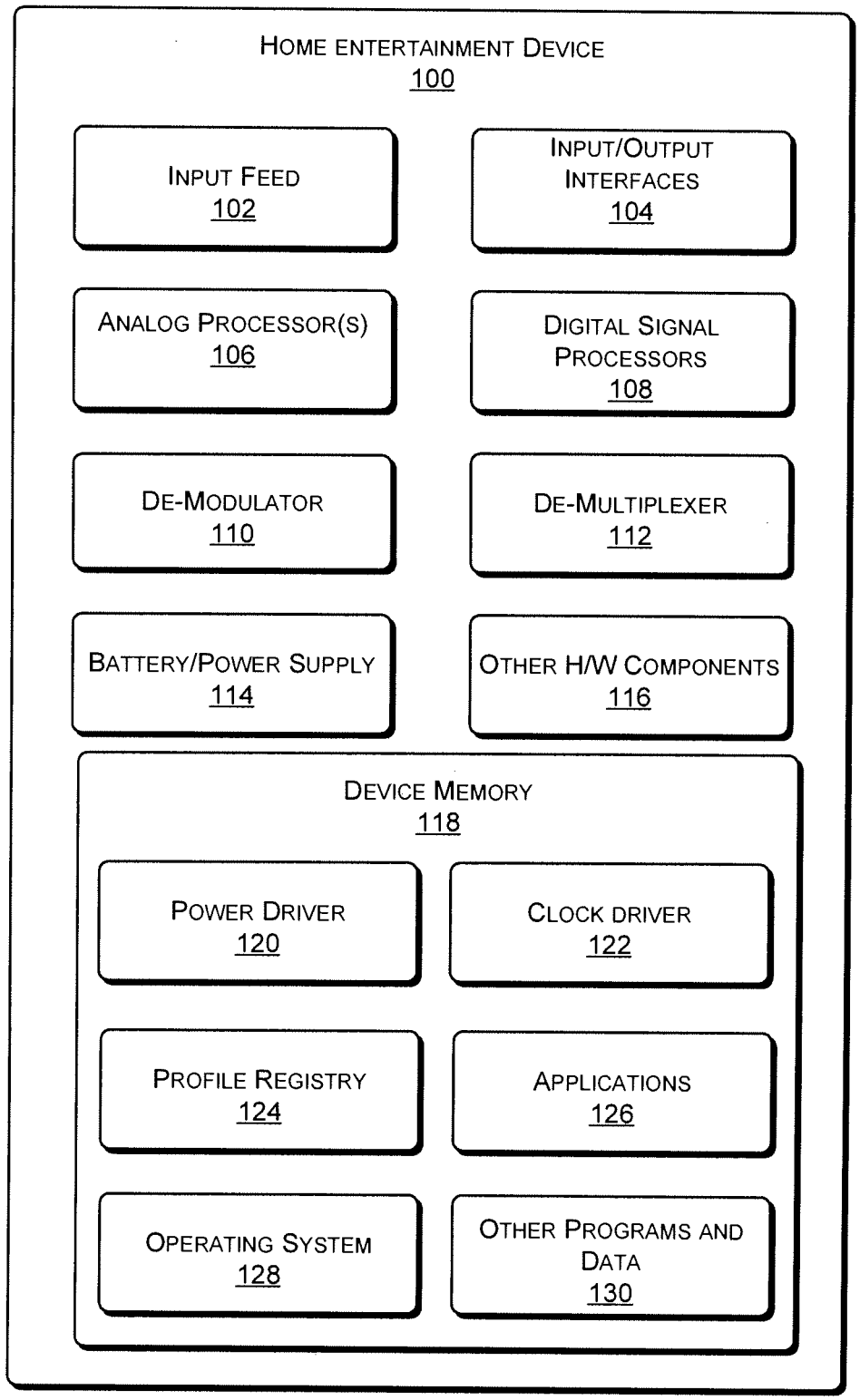
FIG. 1 illustrates a block diagram of an exemplary home entertainment device with power management, according to an embodiment of the present subject matter.

The disclosed subject matter relates to systems and methods for power management in a device such as a home entertainment (HE) device. The systems and methods described herein further relate to reduction of power consumption during an active standby mode and a passive standby mode. Further, the passive standby mode has low latency during suspension and resumption of control.

In one implementation, the active standby mode corresponds to a mode of operation of the HE device where the user may perceive the HE device to be switched off, but the HE device may still be functioning, for example, exchanging data, as the HE device is still plugged in. In this mode of operation, power is provided to components that are functioning while the rest of the components are placed in a low power mode, thereby reducing the power consumption on the whole.

For example, when an application of the HE device receives a request for placing the device in an active standby power mode, the application can instruct a power driver to place the HE device in the active standby mode. For the purpose, the power driver determines a desired profile for the application. In one implementation, a profile can include a list of the drivers and states in which the drivers are to be set for a particular application. The drivers are programs designed to control various components of the HE device.

Based on the determined profile, the power driver invokes callback functions of various drivers, and function calls for operating system (OS) supported components of the HE device that have OS power management support. Further, the power driver also invokes callback functions for the OS supported components of the HE device that do not have OS power management support. On execution of the callback functions, the drivers can place their components and clocks in a low power mode and terminate any running application, thus consuming minimal power. Similarly, on execution of the function calls, OS drivers can suspend the usage of OS supported components and place them in a low power mode, thus consuming minimal power. In one implementation, the power driver can place common clocks, such as clocks associated with a host processor, or co-processor clocks in a scaled down or off mode, thus consuming minimal power.

In another scenario, when the HE device is placed in the passive standby mode, all the services associated with the HE device are disengaged. In one implementation, before placing the HE device in the passive standby mode, data associated with the state of the HE device can be stored in the device memory. The stored data, referred to as state data, corresponds to the state of the HE device just before it was placed in the passive standby mode. Also, while in the passive standby mode, the memory can be placed in a self-refresh mode so that the state data is available for low latency recovery, thus ensuring that the system does not have to be re-initialized to be brought into either an active mode, i.e., a fully functional mode, or the active standby mode. The HE device, when required by the user, can go back into the active mode by fetching the state data and restoring the HE device to a state corresponding to the fetched data. The HE device, for example, a set-top box, can be returned to the active mode by using a remote controller or a front panel button on the HE device.

Thus, the power management system described herein provides low latency during suspension or resumption of control from standby modes and also decreases power consumption during the standby modes.

FIG. 1 illustrates a block diagram of an exemplary home entertainment (HE) device implementing power management support. The HE device 100 may be implemented as any of a variety of electronic devices including, for example, set top boxes, digital video disc (DVD) players, digital or analog televisions, video on demand (VOD) boxes, cable boxes, and so forth. The HE device 100 includes various hardware and software components for its functioning. It will be understood that some implementations of the HE device 100 may have a fewer number of components than those described herein and others may have additional components depending on the functionalities associated with the HE device 100.

In one embodiment, the HE device 100 can include an input feed 102 for receiving signals such as audio-video signals, infrared signals, Ethernet signals, and wireless links, for example Bluetooth signals from a source, such as a cable, a satellite dish or an antenna. The HE device 100 also includes input/output (I/O) interfaces 104, such as interface cards, for allowing other components of the HE device 100 to send and receive signals through the input feed 102. The HE device 100 further includes analog processor(s) 106 for controlling analog components of the HE device 100. In one implementation, the analog processor(s) 106 can include a single processing unit or a number of processing units.

The HE device 100 further includes digital signal processors (DSPs) 108 for processing digital signals sent and received by the HE device 100. The processing may include, for example, compressing, decompressing, and shaping the digital signals. These digital signals may be received either from the input feed 102 and transferred to the DSPs 108 through the input/output (I/O) interfaces 104, or may be generated in the HE device 100. The HE device 100 also includes a de-modulator 110, a de-multiplexer 112, a battery or power supply unit 114, and other hardware (H/W) components 116. The other H/W components 116 may include hardware that are required for performing additional functions associated with the HE device 100, for example, analog to digital converters (ADC), digital to analog converters (DAC), power controllers, and the like.

The analog processor(s) 106 and the DSPs 108 are configured to fetch and execute instructions from a device memory 118. The device memory 118 includes a power driver 120 for managing the supply of power to the other H/W components 116 and other components, such as the de-modulator 110 and the de-multiplexer 112, which are part of a system-on-chip hardware (not shown in the figure). The power driver 120 can manage the supply of power to place the HE device 100 in a particular power mode such as an active mode, an active standby mode, and a passive standby mode.

In one implementation, the active mode is a fully functional mode, where all the components of the of the HE device 100 are functional and supplied with power. The active standby mode corresponds to a mode of operation of the HE device 100, where power is supplied to those components that are functioning while the rest of the components are powered down, thereby reducing the overall power consumption. Whereas, in the passive standby mode, all the services associated with the HE device 100 are disengaged.

The device memory 118 also includes a clock driver 122 that provides clock signals to IP cores and various components, collectively referred to as components, of the HE device 100. Further, the device memory 118 includes a profile registry 124, applications 126, an operating system (OS) 128, and other programs and data 130. The OS 128 is typically a set of programs used to maintain and execute programs related to the HE device 100.

The applications 126 are a set of programs used for performing different functions of the HE device 100 such as playing or recording audio and video files, accessing the Internet, and so on. Each of the applications 126 is associated with one or more profiles (not shown in this figure). Each profile includes a list of drivers and the states of the drivers for the execution of the application 126 with which the profile is associated. The drivers are programs designed to control various components of the HE device 100.

The applications 126 register their profiles with the power driver 120 by making a profile entry in the profile registry 124. In one implementation, the applications 126 register their profiles when the applications 126 are used for the first time. The applications 126 make a profile registration call to the power driver 120 for making the profile entry. On receiving the profile registration call, the power driver 120 generates profile IDs for the profiles associated with each of the applications 126. Further, the power driver 120 stores the respective profiles of the applications 126 along with their profile IDs in the profile registry 124 and returns the profile IDs to the applications 126.

Through these profile IDs, the applications 126 can communicate a profile, to be set, to the power driver 120. For example, an application for performing recording can have one profile for recording an audio broadcast and one profile for recording both the audio and video broadcast. Both the profiles will include all components related to audio/video broadcast; however, they may be set at different states of operation. In both the cases, the power driver 120 will invoke related drivers for performing the desired application. For example, in response to a request for recording only the audio broadcast, the power driver 120 can invoke call back functions so that only the audio drivers function normally while other drivers are scaled down or switched off depending on the profile settings. For example, in response to the callback functions, a clock (not shown in the figure) associated with the other drivers is scaled down to a low frequency or switched off, and the components not required for recording the audio broadcast are powered off.

In another implementation, the power driver 120 can also use operating system (OS) function calls for OS drivers (not shown in this figure). The OS drivers suspend the usage of OS supported components and place them in a low power mode, thus providing for minimum power consumption. In case the OS 128 does not support low power modes, then the power driver 120 handles the OS supported component itself. In such cases, the OS 128 is requested to suspend the usage of the components required for recording video broadcast. Once suspended, the power driver 120 powers off these components. Thus, the power driver 120 can set components and associated clock domains in the states mentioned in a particular profile.

In operation, the HE device 100 can receive an input, such as a power mode input, for control suspension (i.e., going into a standby mode) or control resumption (i.e., going into the active mode). The input can be received from a user or a broadcaster, for example, via a remote control, a device front panel, a satellite signal, an Ethernet connection, or a wireless link such as a Bluetooth signal. Accordingly, the power driver 120 sets various components in a state desired by the received input. Such a state is set based on the profiles, registered and stored in the profile registry 124, corresponding to the applications 126 associated with the received input.

Figure 2:
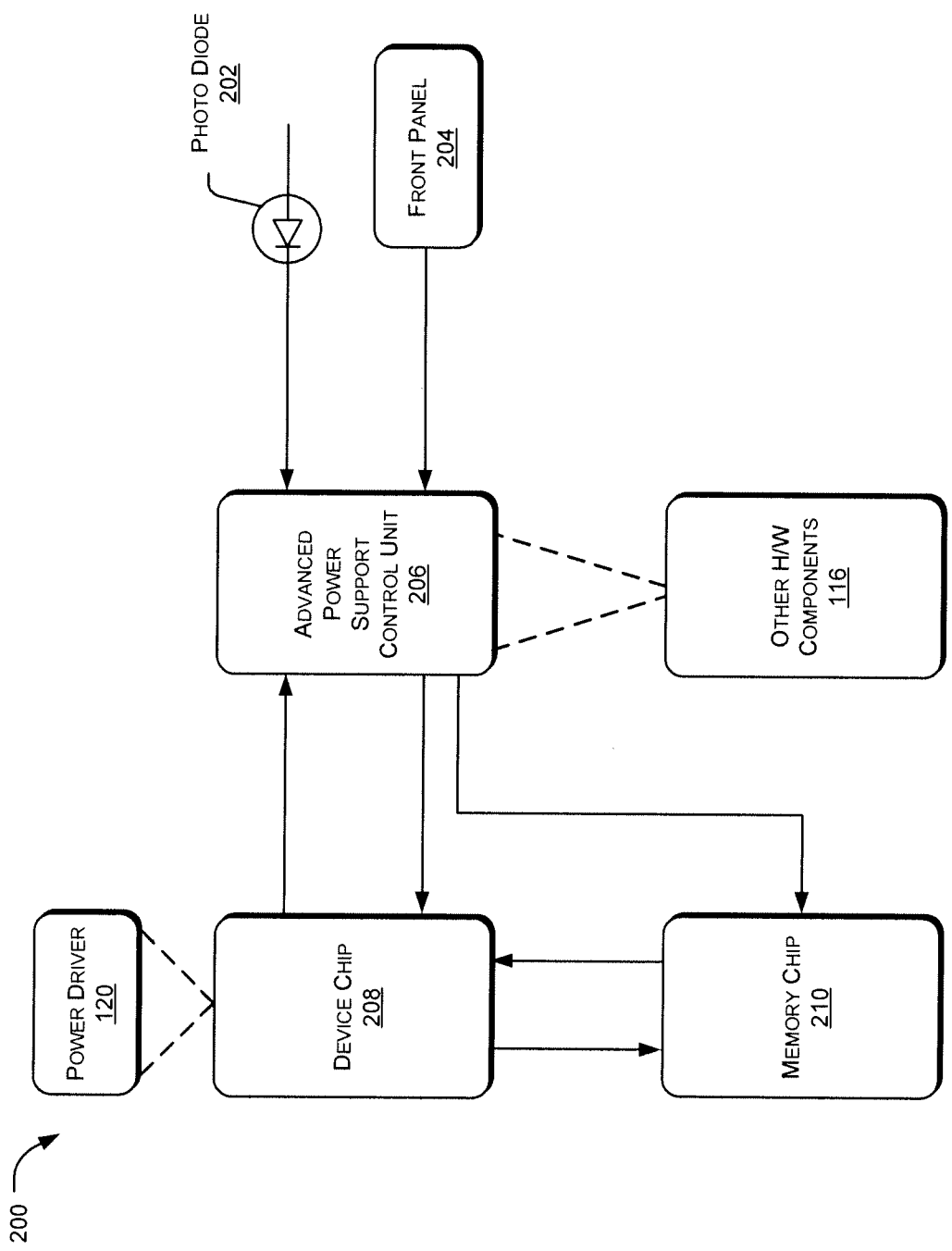
FIG. 2 illustrates an exemplary device architecture for power management in a home entertainment device, according to an embodiment of the present subject matter.

FIG. 2 illustrates an exemplary device architecture 200 for power management in the HE device 100 according to an embodiment of the present subject matter. The HE device 100 can receive requests, for example, from a user via control devices, such as a remote controller. The request can be received through a photo diode 202 or a front panel 204, both being associated with the I/O interfaces 104. In an implementation, an advanced power support control unit 206, which is one of the other hardware components 116, receives the request from the control devices. The advanced power support control unit 206, interchangeably referred to as a control unit 206, sends the request to the power driver 120, which is a part of a device chip 208. Based on the request, the power driver 120 determines the state of the HE device 100 as desired by the user and accordingly provides a signal to the control unit 206.

The control unit 206, based on the signal from the power driver 120, individually switches ON or OFF the power supply of different IPs, such as the device chip 208, a memory chip 210, and other hardware components 116, all being a part of a system-on-chip (SOC) hardware (not shown in this figure). In one implementation of the above embodiment, the device chip 208 may include the clock driver 122, the profile registry 124, the applications 126, the DSPs 108, the de-multiplexer 112, and the de-modulator 110.

To achieve low latency, especially when in the passive standby mode, the power driver 120 uses the memory chip 210. The memory chip 210 can be a Double-Data-Rate Synchronous Dynamic Random Access Memory, also known as DDR SDRAM or DDR RAM. On receiving a request for initiating the passive standby mode, the power driver 120 saves, in the memory chip 210, the state data of applications being currently run by various processors. The state data is stored so that the applications can resume from the stage at which they were suspended. After saving the state data, the power driver 120 requests the control unit 206 to switch off the power supply of the complete SOC hardware except the memory chip 210. The functioning of the power driver 120 is explained in detail with reference to FIG. 3 below.

Figure 3:
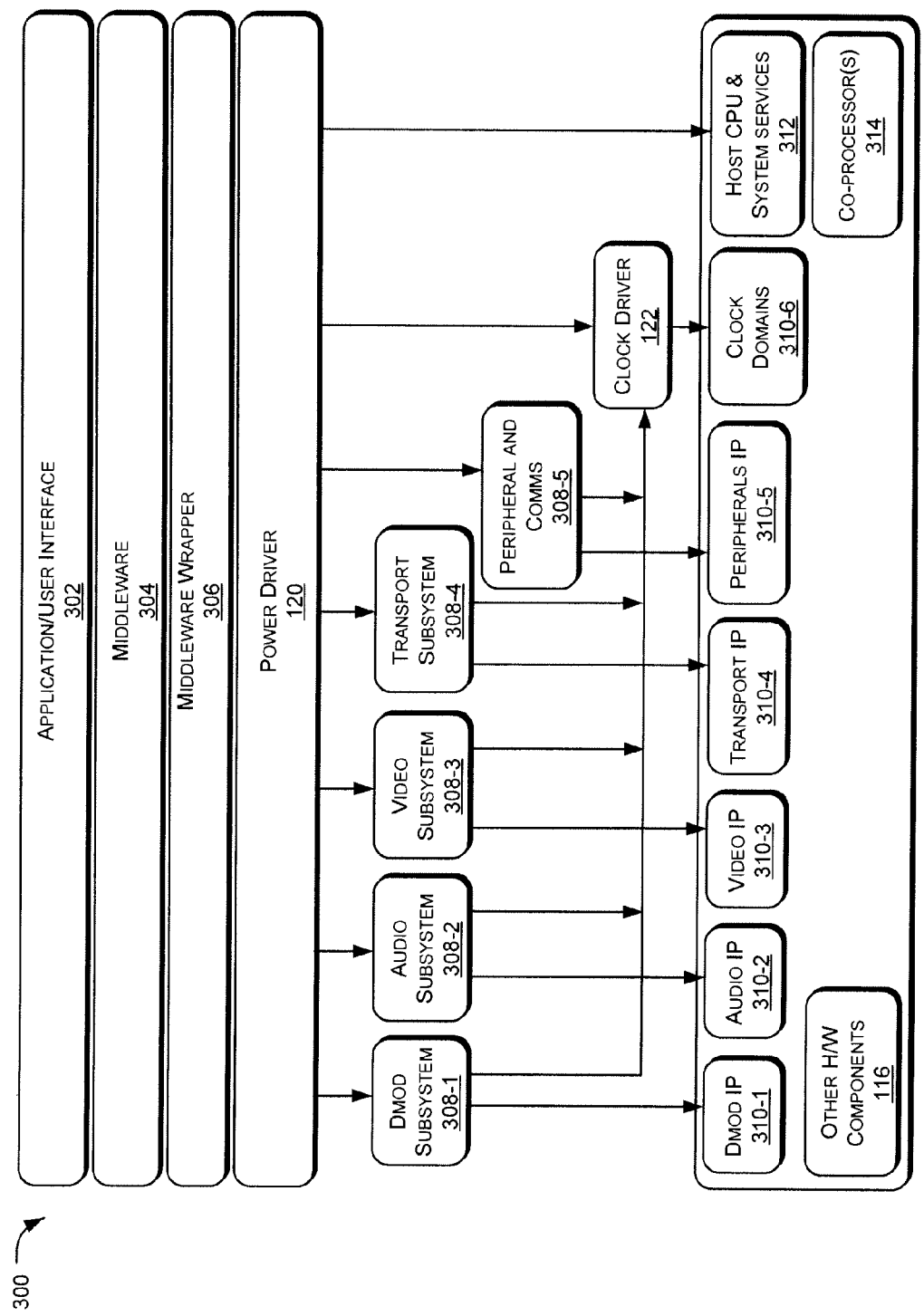
FIG. 3 illustrates a block diagram of a system architecture for power management in a home entertainment device, according to an embodiment of the present subject matter.

FIG. 3 illustrates a block diagram of a system architecture 300 for power control of the HE device 100 with power management support, according to an embodiment of the present subject matter. The system architecture 300 includes various layers such as an application/user interface 302, a middleware 304, a middleware wrapper 306, and a power driver 120.

The application/user interface 302, hereinafter referred to as user interface, includes the applications 126 and acts as an interface between the power driver 120 and the control unit 206. The user interface 302 can receive inputs, such as selected power mode inputs from various sources, such as from a user via a remote control or a device front panel, a satellite signal from a broadcaster, an Ethernet connection, or a wireless link such as a Bluetooth signal. The user interface 302 can also provide prompts and information to the user through the control unit 206. The middleware 304 and the middleware wrapper 306 are used to abstract functionalities of the HE device 100 as is known in the art.

The middleware 304 and the middleware wrapper 306 are used to isolate applications 126 from the details of the underlying network and hardware components. This considerably reduces the complexity of content development because the applications 126 can be written to take advantage of a common interface. In one implementation, the middleware 304 and the middleware wrapper 306 provide an interface between the applications 126 and the power driver 120.

The power driver 120 manages power supply and functioning of individual components of system-on-chip (SOC) hardware 310 through the control unit 206 and various power subsystems 308. The various power subsystems 308 are configured as drivers for controlling the SOC hardware 310. The various subsystems include a Dmod subsystem 308-1, audio subsystem 308-2, video subsystem 308-3, transport subsystem 308-4, and peripheral and communication subsystem 308-5, collectively referred to as subsystems 308. In addition, the power driver 120 also manages power supply to the clock driver 122.

The various subsystems 308 and the clock driver 122 correspond to software drivers, which in turn control the components present on the SOC hardware 310, such as corresponding IPs, the device chip 208, and the other hardware components 116. The corresponding IPs on SOC hardware 310 can include Dmod IP 310-1, audio IP 310-2, video IP 310-3, transport IP 310-4, peripherals IP 310-5, hereinafter collectively referred to as IPs, and clock domains 310-6. The SOC hardware 310 further includes host CPU and system services 312, hereinafter referred to as host processor(s), co-processor(s) 314, and may include the memory chip 210 in one embodiment. In one embodiment, the components in the SOC hardware 310 are designed to operate at multiple power voltage and frequency levels.

The power driver 120 is configured to direct the power subsystems 308 to change a mode of operation of the components of the SOC hardware based on the selected power mode input. In one embodiment, the mode of operation may be selected from an ON mode and the low power mode. The subsystems 308 may also include customized drivers and drivers that are a part of the OS 128. The OS drivers are used for controlling components supported by the OS 128, hereinafter referred to as OS supported components. For example, in Linux, the Ethernet driver is a part of the OS. Also, for the customized drivers, the power driver 120 may interface directly by registration and call back functions. For the drivers of the OS supported components, if the OS 128 supports power management, the power driver 120 uses their exposed application programming interfaces (APIs); otherwise, the power driver 120 can implement the low power modes for the OS supported components not having OS power management support.

The clock driver 122 manages the clocks of the SOC hardware 310, by either scaling down or switching off the clocks. The clock driver 120 first determines whether the clock domains 310-6 are shared between different components or are dedicated exclusively to a particular component. If a clock is shared, then the clock driver 120 conforms, by sending callback functions, from all the components sharing the clock before switching off or scaling down the clock.

For example, if a subsystem 308 wants to scale down or switch off its clock and the clock is a shared clock, then the power driver will send callback functions to all the components sharing the clock. If all the components sharing the clock agree, then the power driver 120 will scale down the clock, i.e., decrease its working frequency, or place the clock in the low power mode depending on the request made by the driver.

If the clock is exclusive to the driver, then the power driver 120 will switch off or scale down the clock directly. On the other hand, if a driver requests for enabling a clock, then the power driver 120 simply enables the clock irrespective of it being exclusive or shared.

For illustration purposes, consider the HE device 100 operating in the active mode. The user interface 302 may receive a request, via the control unit 206, for entering the active standby mode. The user interface 302 then determines the profile of the applications 126 that are running and need to be stopped for entering the active standby mode. Based on the determined profile, the power driver 120 selects the components associated with applications 126 that need to be stopped and instructs the power subsystems to place the selected components in the low power mode.

For the selected components, the power driver 120 invokes callback functions of customized subsystems or drivers and function calls for operating system (OS) supported drivers. If the OS 128 does not support low power modes, then the power driver 120 handles the low power mode itself. For the purpose, the power driver 120 requests the OS 128 to suspend the use of the OS supported components so that the power driver 120 can place them in the low power mode. As per the callback function instructions, the subsystems 308 can place their components and clocks in the low power mode so that the associated IPs consume minimal power.

The low power mode can be explained as the condition where the selected components of the SOC hardware 310 stop functioning and hence consume minimal power. The power driver 120 may also instruct the clock driver 122 to place common clocks, i.e., clocks shared between various processors, such as the host processors 312 and the co-processors 314 in the scaled down mode, if required in the determined profile. In this way, the HE device 100 is placed into an active standby mode. In one embodiment, the power driver 120 may automatically place the HE device 100 in the active standby mode when it receives no input from the user for a long period of time. In such a case, the control unit 206 may trigger the active standby mode by sending a signal to the user interface 302.

In order to resume control from the active standby mode, the user interface 302 waits for an "Out of Standby" event in the form of a wake up signal through the I/O interfaces 104, via the control unit 206. The user interface 302 determines a wake up reason on receiving the wake up signal. The execution of the user interface 302 is made possible in the active standby mode by running the CPU services 312 on reduced clocks. The wake up reason can be either a request for running one of the applications 126 received from a user, from a broadcaster or from a remote device through an Ethernet connection.

On determining the wake up reason, the user interface 302 can instruct the power driver 120 to go into ON mode and restore those components that are associated with the applications 126 required for the wake up. The components to be restored are determined from the profiles of the applications 126. For example, if the wake up reason is due to a user providing a command to record an audio or video file, the power driver 120 will retrieve the profile corresponding to active mode of operation of the application for audio or video recording. Based on the retrieved profile, the power driver 120 instructs the power subsystems 308 to resume control of the various components. For example, the power driver 120 can instruct the audio video subsystems 308-2 and 308-3 to restore the power of the corresponding IPs 310-2 and 310-3.

For the resumption of control, the power driver 120 can first restore the common clocks through the clock driver 122. The power driver 120 then invokes desired callback functions of the corresponding subsystems or drivers and function calls for the OS supported components. In the callback functions, the subsystems 308 enable the desired IP components and associated clocks. For the OS supported components, if the OS 128 does not support the low power modes, then the power driver 120 restores the power and allows the OS 128 to resume usage of the OS supported components that were being used before going in the low power mode. Thus, in the active mode all the SOC hardware 310 are connected to the power supply 114.

In another scenario, for illustration purposes, consider the HE device 100 operating in either the active mode or the active standby mode. The user interface 302 may receive a request for entering the passive standby mode through the I/O interfaces 104, via the control unit 206. The user interface 302 instructs the power driver 120 to go into the passive standby mode. The power driver 120, in turn, first redirects all the subsystems 308 to go into the low power mode by invoking callback functions of the customized drivers and function calls for the OS supported components.

On execution of the callback functions, the subsystems 308 place their SOC hardware 310 and clocks in the low power mode. Thus, the SOC hardware 310 enters the low power mode and stops functioning, thereby consuming minimum power, and is ready to be disconnected from the power supply. Further, the power driver 120 can save snap-shots of processors, such as the host processors 312, co-processors 314, and execution images of Program Counter and other registers onto the memory chip 210. In one embodiment, the snapshots of the processors include states of applications being executed.

The power driver 120 thus saves the state data of the applications 126 being executed by the various processors in the memory chip 210. The power driver 120 can then place the memory chip 210 into the self-refresh mode. Further, the power driver 120 requests the control unit 206 to switch OFF the power supply of the complete SOC hardware 310 including the host processors 312, the co-processors 314, the corresponding IPs, and other hardware circuits. The HE device 100 is now in the passive standby mode. In one embodiment, the control unit 206 may automatically trigger the passive standby mode by sending an input to the user interface 302 when the device 100 receives no input from the user for a long period of time after being placed in the active standby mode.

In order to resume control, i.e., to bring the HE device 100 into the active mode from the low latency passive standby mode, the user interface 302 receives an instruction from the user to enable the power supply of the SOC hardware 310. The instruction may be received from a remote control via the photo diode 202 or through the front panel 204 of the HE device 100.

The user interface 302 sends the request to the control unit 206, which then re-powers the SOC hardware 310 circuitry. For this, a boot loader (not shown in this figure) places the memory chip 210 out of the self-refresh mode and the control is restored to a point just before the power supply was switched off. As the SOC hardware 310 is re-powered, all clocks and components can resume the applications they were running before going in the passive standby mode.

In one implementation, the power driver 120 may also read the status of the control unit 206 to determine the wake up reason, i.e., whether the wake up is achieved via the remote or the front panel activity, and pass on the status to the user interface 302. On determining the wake up reason, the user interface 302 instructs the power driver 120 to go into the ON mode.

While going into the ON mode, the power driver 120 first restores the common clocks of the HE device 100. The power driver 120 then instructs each subsystem 308 to restore functioning of the components of the SOC hardware 310 for bringing the HE device 100 out of the passive standby mode. The power driver 120 instructs the subsystems 308 to go into the active mode by invoking callback functions of the customized drivers and function calls for the OS supported components. If the OS 128 does not support low power modes, then the power driver 120 can handle the callback functions itself. On execution of the callback functions, the drivers enable the component IPs and associated clocks. In this way, the HE device 100 returns to the active mode.

The power driver 120 can thus manage power supply to the components embedded on the SOC hardware 310 and the clock domains 310-6 through the control unit 206, subsystems 308 and the clock driver 122, respectively, based on the power mode input. The power driver 120 manages the power supplied to the components of the SOC hardware 310 by directing the control unit 206 to switch off the power supply to selected components after the components have been placed in the low power mode by the power subsystems 308.

FIGS. 4-7 illustrate exemplary methods for implementing power management in a device. The order in which the methods are described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the methods can be implemented in any suitable hardware, software, firmware, or combination thereof.

Figure 4:
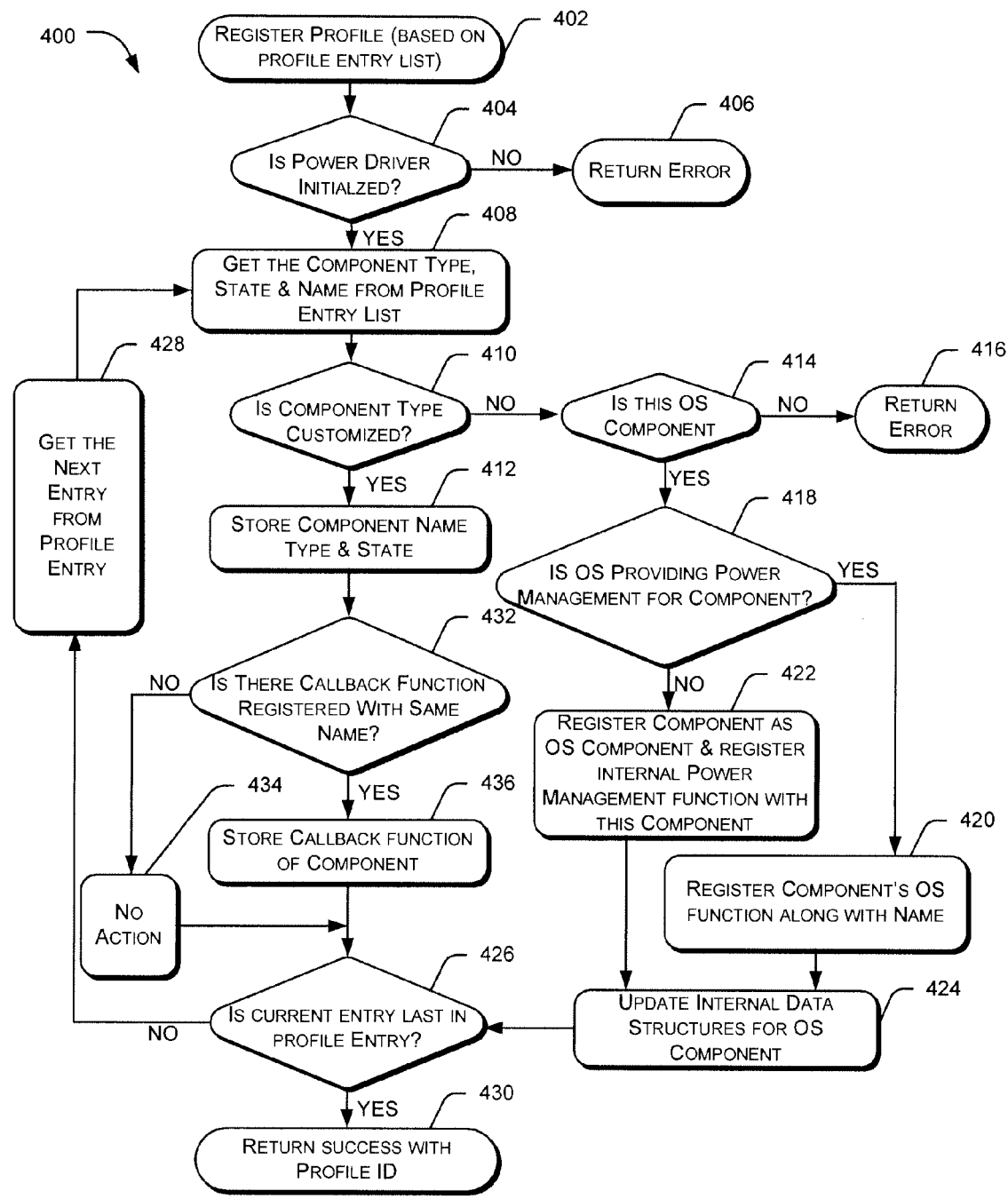
FIG. 4 illustrates an exemplary process of registering an application for power supply control, according to an embodiment of the present subject matter.
Figure 5:
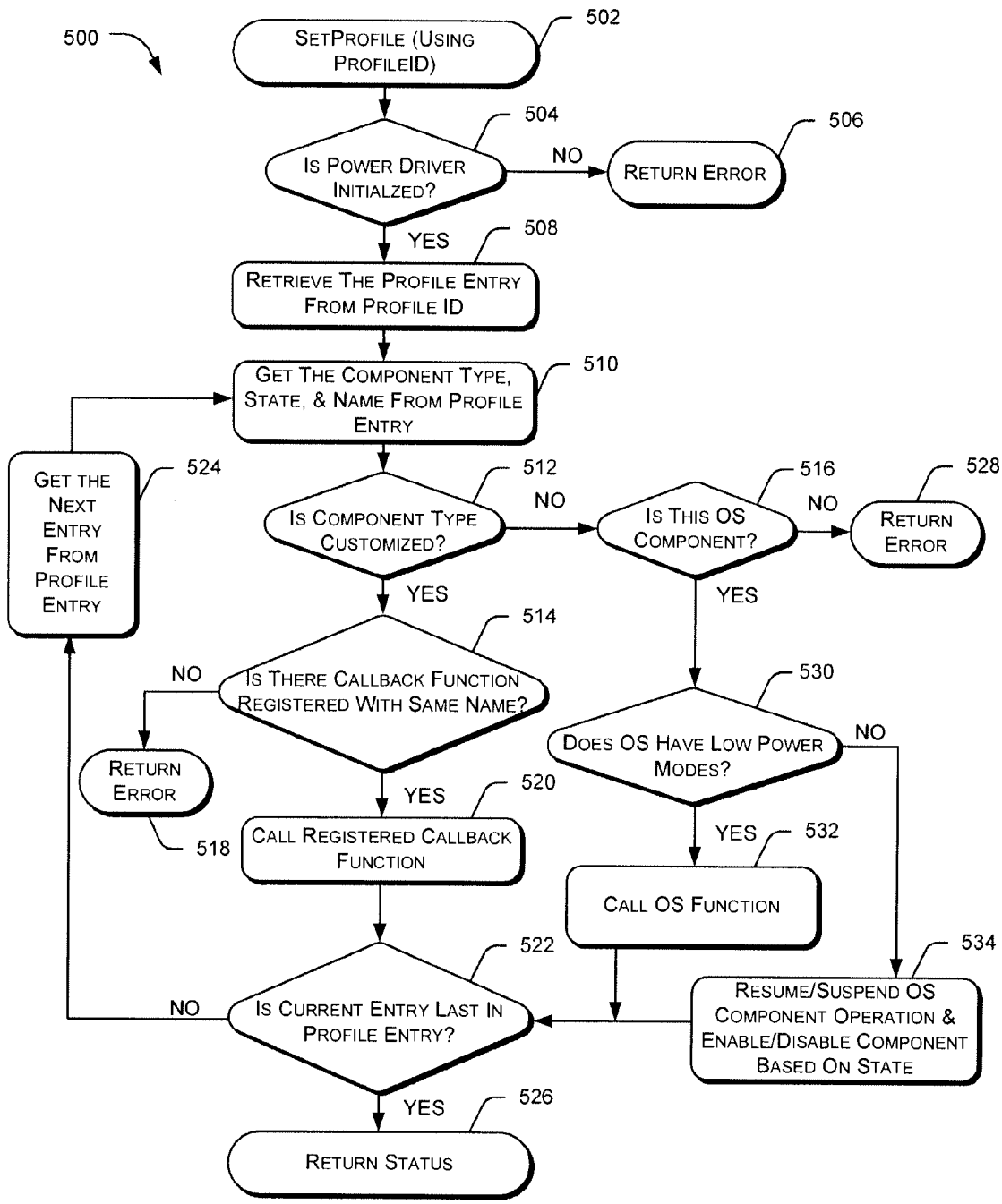
FIG. 5 illustrates an exemplary process for placing the device in an active standby mode and resuming operations of the device from the active standby mode, according to an embodiment of the present subject matter.

FIGS. 4 and 5 respectively illustrate an exemplary method 400 for implementing profile registration and a method 500 to place an HE device such as the HE device 100 in the active standby mode or resume the active mode from the active standby mode.

According to FIG. 4, at block 402, an application registers a profile based on a profile entry list. In one implementation, an application, such as the application 126 of the HE device 100, for example, a set-top box, makes a profile entry. The application 126 makes the profile entry for registering a profile in the profile registry 124 and generating a profile ID for the same.

At block 404, the application 126 determines whether a power driver, such as the power driver 120, is initialized or not. If the power driver 120 is not initialized, an error is returned at block 406; otherwise, the "Yes" path is followed from block 404 to block 408. At block 408, the power driver 120 reads the component type, state, and name from the profile entry list and proceeds to block 410.

At block 410, it is determined whether the component type corresponds to a customized component. In case the component is of customized type, i.e., in case of "yes", the component name, type, and state are stored in a memory of the device chip 208 at block 412. Otherwise, in the case of "No", the process 400 moves to block 414.

At block 414, it is determined whether the component type corresponds to an OS supported component or not. If the component is not an OS supported component, an error is returned at block 416. Otherwise, in case of "yes", the process 400 moves to block 418 where it is determined whether the OS, such as the OS 128, provides power management for the component or not.

If the OS 128 facilitates power management for the component, then at block 420, the OS function of the component along with component name is registered. In case the OS 128 does not facilitate power management for the component, the "No" path is followed from block 418, and at block 422 the component is registered as an OS supported component. An internal power management function, such as a callback function, of the OS supported component is also registered with the power driver 120 at block 422. Thus the power driver 120 can handle low power mode for the OS supported components using the internal power management functions.

Following registering of the component name and OS or callback function at block 420 or 422, the process 400 moves to block 424 where internal data structures for the OS supported components are updated. The process 400 then moves to block 426 where it is determined whether the current component entry is the last entry in the profile to be registered. If the current entry is not the last entry for the profile, then the process 400 moves to block 428 to receive the next entry and thereupon to block 408, after which the same process 400 as described above takes place. If the current entry is the last in the profile entry, the "yes" path is followed from block 426, and successful registration of the profile is returned with the profile ID at block 430.

Referring back to block 412, where the process 400 moved after it was found that the component is of customized type, the process 400 then moves to block 432 where it is determined whether any callback function is registered with the same name. If there is no such callback function already registered, a function is neither called nor is any action taken at block 434. This is because for inclusion in a profile, callback functions corresponding to the component have to be registered with the power driver 120 so that the power driver 120 can invoke the callback functions when required. In case there is a callback function registered with the same name as that of the component, then at block 436, the callback function of that component is stored in the memory of the device chip 208.

From blocks 434 and 436, the process 400 reaches decision block 426 where it is determined whether the current entry in the profile entry is the last entry for profile registration. In case the entry is not the last entry, the process 400 moves to block 428 where, as described earlier, the next entry is received from the list of profile entries and the process 400 again moves to block 408 and continues as described earlier. In case the entry is the last entry, the process 400 moves to block 430 where, after successful profile registration, the profile ID thus generated is returned.

According to FIG. 5, at block 502, an application requests for setting a profile using a profile ID. For example, in one implementation, an application, such as the application 126 of the HE device 100, for example, a set-top box, requests for setting a profile corresponding to an active standby mode using a profile ID. Further, at block 504, the application 126 determines whether a power driver, such as the power driver 120, is initialized. In case the power driver 120 is not initialized, an error is returned at block 506. Otherwise, the power driver 120 retrieves a profile entry from the profile registry 124 using the profile ID of the application 126. At block 510, the power driver 120 reads the component type, state, and name from the profile entry retrieved at block 504 and the process 500 moves to block 512.

At block 512, it is determined whether the component type is customized. In case the component type is customized, i.e., in case of "yes", the process 500 moves to block 514. Otherwise, in case of "No", the process 500 moves to block 516.

At block 514, it is determined whether any callback function is registered with the same name. If there is no such callback function already registered, an error is returned at block 518. In case there is a callback function registered with the same name as that of the component, then at block 520, the power driver 120 invokes the registered callback function for the application.

From block 520, the process 500 reaches decision block 522 where it is determined whether the current entry in the profile entry list is the last entry. In case the entry is not the last entry, the process 500 moves to block 524; otherwise, the process 500 follows the "yes" path to block 526 where status of the component in the profile is returned to the application 126.

At block 524, the power driver 120 reads the next entry from the profile entry list and the process 500 moves to block 510. The process 500 is then repeated until an error or success, i.e., return status is achieved as described above.

Going back to block 516, where the process 500 moved after it was determined that the component type is not customized, it is determined whether the component is an operating system (OS) supported component or not. If the component is not an OS supported component, an error is returned at block 528; otherwise, the process 500 moves to block 530.

At block 530, it is determined whether an OS such as the OS 128 supports low power modes or not. If the OS 128 supports low power modes, then at block 532, a command is given to call OS function. In case the OS 128 does not support low power modes, the process 500 follows the "No" path from block 530 and moves to block 534. At block 534, the OS operation is resumed or suspended and the component is enabled or disabled based on the state of the component in the profile by the power driver 120 using callback functions registered with the power driver 120.

From blocks 532 and 534, the process 500 moves to block 522 where it is determined whether the current entry is the last profile entry. If the current entry is the last, status of the component in the profile is returned to the application 126 at block 526. Otherwise, the process 500 moves to block 524 and the process 500 continues as described earlier.

Figure 6:
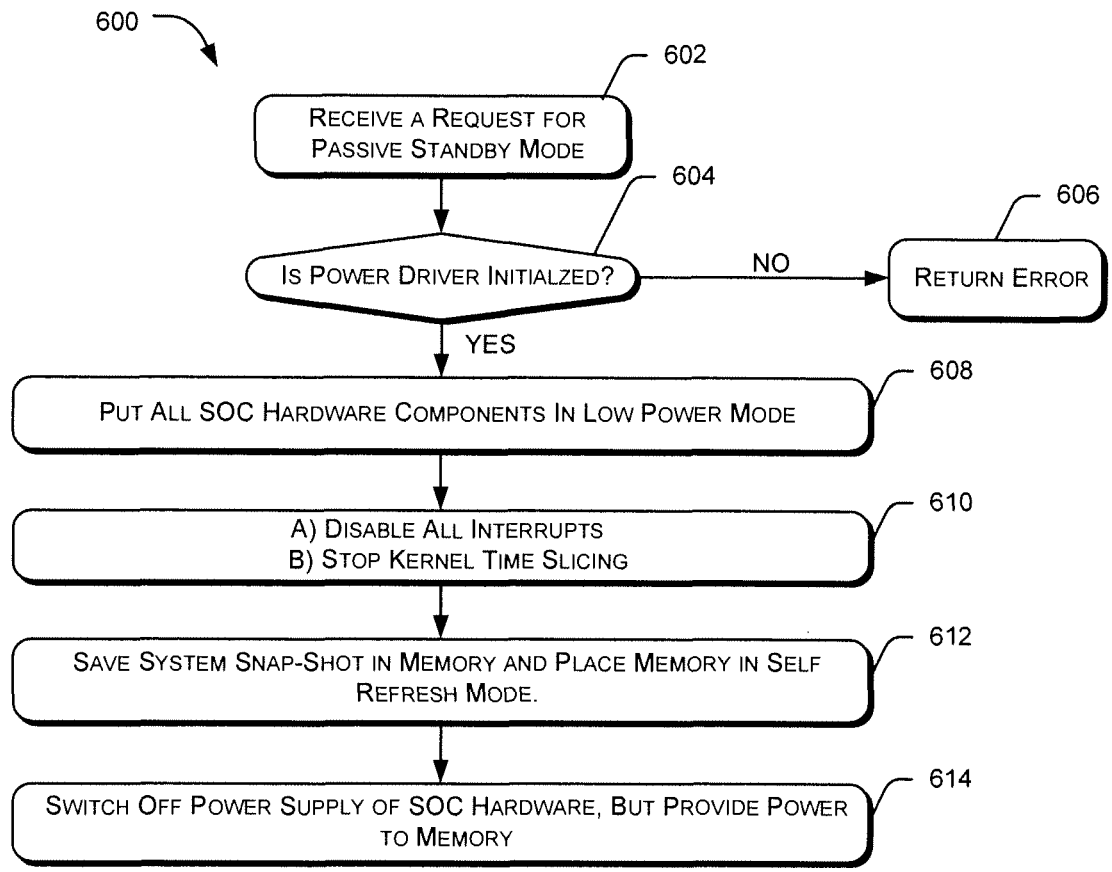
FIG. 6 illustrates an exemplary process for placing the device in a passive standby mode, according to an embodiment of the present subject matter.
Figure 7:
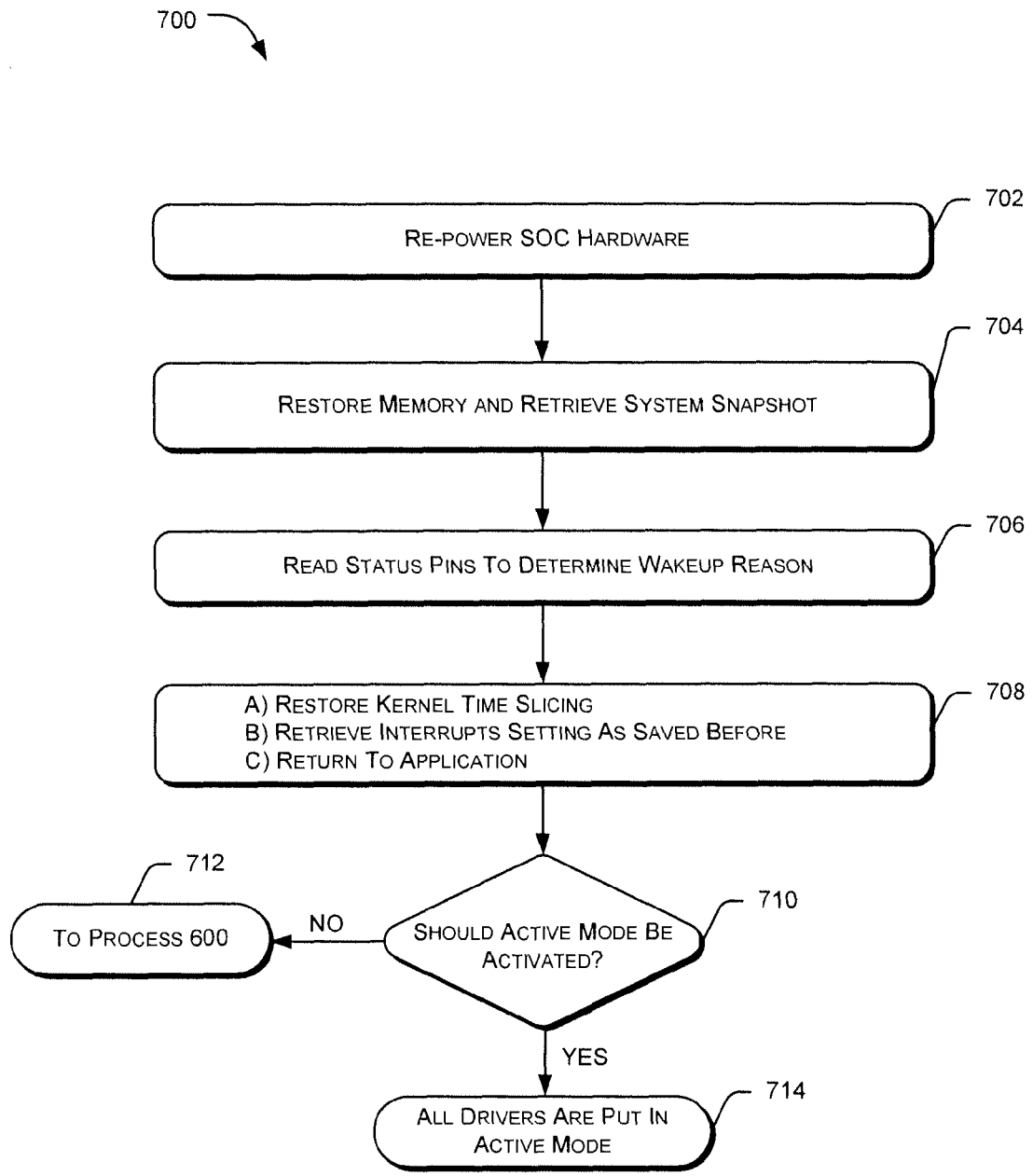
FIG. 7 illustrates an exemplary process for resuming operations of the device from the passive standby mode, according to an embodiment of the present subject matter.

FIGS. 6 and 7 illustrate exemplary methods 600 and 700 for implementing a passive standby mode, and to resume an active mode from the passive standby mode in the HE device 100.

At block 602, a request for the passive standby mode is received by the user interface 302. At block 604, it is determined whether a power driver, such as the power driver 120, is initialized. If the power driver 120 is not initialized, then an error is returned at block 606 and the process 600 stops.

If the power driver 120 is initialized, then the process 600 continues at block 608 where all the component of the SOC hardware 310 are placed in a low power mode by the power driver 120 through the control unit 206. For this, the power driver 120 invokes callback functions for the customized drivers and OS function calls for the OS supported components. If there is an OS supported component for which the OS 128 does not support the low power mode, then the power driver 120 invokes the internal power management functions such as the callback functions for the OS supported component. As a response to the callback function or OS function calls, each component driver saves the state data of the running applications.

At block 610, the control unit 206 disables all interrupts and stops kernel time slicing. Kernel time slicing, as known in the art, refers to the time allocation to each component for execution of its process. Similarly, interrupts, as known in the art, refers to an instruction requiring immediate attention of a component thus causing the related processors to switch from one application to another. Disabling interrupts and stopping kernel time slicing thereby ensures that no components are functional.

At block 612, snapshots of the processors are saved onto the memory chip 210 and the memory chip 210 is placed in the self-refresh mode. The power driver 120 also stops the clock signals to the memory chip 210. The saved snapshots can be used later for low latency recovery of operations.

At block 614, the control unit 206 switches off power supply to the SOC hardware 310. However, the memory 210 remains powered ON so that the snapshots are available on resumption of control. Thus, the HE device 100 is placed in the passive standby mode where no components of the SOC hardware 310 receive power and therefore, minimal power is consumed.

With reference to FIG. 7, at block 702, a request in the form of a wake up signal is received from, for example, the remote control via photo diode 202 or the front panel 204 of the HE device 100, and the control unit 206 re-powers the SOC hardware 310. At block 704, the control unit 206 uses a boot loader, such as a power management aware boot loader to restore memory, such as the memory chip 210, and retrieve the saved snapshots from the memory chip 210. Other pointers and registers are also recovered from the memory chip 210 and restored so that execution of the application can start from the last saved location.

At block 706, the power driver 120 reads status pins to determine the wake up reason. On determining the wake up reason, the user interface 302 can instruct the power driver 120 to go into ON mode and restore those components that are associated with the applications 126 required for the wake up. At block 708, the power driver 120 restores kernel time slicing and retrieves interrupts setting from the memory chip 210. Further, the power driver 120 returns to the applications 126 that were being executed just before the HE device 100 was placed in the passive standby mode.

At block 710, it is determined whether the HE device 100 is to be returned to an active mode or not. If the determination yields that the HE device does not have to be placed in the active mode, then at block 712, the process returns to block 602 of the process 600 to set the HE device 100 in the passive standby mode. However, based on the determination, if the HE device 100 is to be returned to the active mode, then from block 710, the control passes to block 714. At block 714, the power driver 120 places all the SOC hardware 310 in the active mode by invoking callback functions or OS function calls as described earlier.

Although embodiments for implementing power management in a device have been described in language specific to structural features and/or methods, it is to be understood that the invention is not necessarily limited to the specific features or methods described. Rather, the specific features and methods are disclosed as exemplary implementations for the power management in a device.

We claim:

1. A device comprising:
a system-on-chip (SOC) hardware comprising a plurality of components including at least one clock;
a memory;
power subsystems configured as drivers for controlling the plurality of components of the SOC hardware;
a user interface configured to receive a selected power mode as an input and to identify profiles of one or more applications being executed; and
a power driver configured to direct the power subsystems to change a mode of operation of at least one component of the SOC hardware based on the selected power mode, wherein the at least one component is determined from the profiles of the one or more applications being executed, wherein the selected power mode is selected from a group of an active mode, an active standby mode, and a passive standby mode, and
wherein, before placing the device in the passive standby mode, data associated with an application is stored in the memory such that, while in the passive standby mode, the memory is placed in a self-refresh mode so that any state data is available for low latency recovery, and
if a clock is shared by any components, the power driver sends call back functions from all components sharing the clock to scale down or switch off the clock when all components sharing the clock agree, and if the clock is exclusive to the component, the power driver will scale down the clock directly;
a control unit for controlling power supplied to the components of the SOC hardware, wherein the power driver is further configured to direct the control unit to switch off the power supplied to the plurality of components of the SOC hardware in the passive standby mode; and
wherein, before placing the device in the active standby mode, data for a profile entry of the component and whether it is customized is stored in memory, and the control unit retrieves the profile entry from memory and determines whether a component is customized to resume operation from the active standby mode.

2. The device as claimed in claim 1, wherein the power driver is configured to place a common clock in the SOC hardware in a scaled down mode based on the profiles of the one or more applications being executed and the selected power mode.

3. The device as claimed in claim 1, wherein the mode of operation is selected from an ON mode and a low power mode.

4. The device as claimed in claim 1, wherein the power driver is configured to:

invoke operating system (OS) function calls for OS supported components having OS power management support to change the mode of operation of the OS supported components having OS power management support; and
invoke callback functions for the power subsystems of customized components and for OS supported components not having OS power management support to change the mode of operation of the customized components and the OS supported components not having OS power management support.

5. The device as claimed in claim 1, wherein the user interface receives the selected power mode from at least one of a remote control, a device front panel, a satellite signal, an Ethernet connection, and a wireless link.

6. The device as claimed in claim 1, wherein the device is a home entertainment device selected from a group of a set top box, a digital video disc player, a digital television, and a video on demand box.

7. A method comprising:
receiving a request for entering into an active standby mode; and in response to receiving the request:
determining a profile of an application being executed; and
placing one or more components of a system-on-chip (SOC) hardware into low power mode based on the profile,
wherein the SOC can also be placed into two additional power modes including an active mode and a passive standby mode, and
wherein, before placing the SOC in the passive standby mode, data associated with the state of the SOC is stored in a memory such that, while in the passive standby mode, the memory is placed in a self-refresh mode so that the state data is available for low latency recovery, and
if a clock is shared by any components, the power driver sends call back functions from all components sharing the clock to scale down or switch off the clock when all components sharing the clock agree, and if the clock is exclusive to the component, the power driver will scale down the clock directly;
directing a control unit that supplies power to the components of the SOC hardware to switch off the power supplied to the plurality of components of the SOC hardware when in the passive standby mode; and
before placing the device in the active standby mode, data for a profile entry of the component and whether it is customized is stored in memory, and directing the control unit to retrieve the profile entry from memory and determine whether a component is customized to resume operation from the active standby mode.

8. The method as claimed in claim 7, wherein placing the SOC hardware in the low power mode comprises invoking operating system (OS) function calls for OS components having power management support and callback functions for customized drivers and OS components not having power management support.

* * * * *